United States Patent
Pascua et al.

(10) Patent No.: US 10,275,698 B2
(45) Date of Patent: Apr. 30, 2019

(54) STORED VALUE CARD AND CARRIER ASSEMBLY WITH TAMPER EVIDENT LABEL

(71) Applicant: Travel Tags, Inc., North Mankato, MN (US)

(72) Inventors: Shelle B. Pascua, Sherwood, OR (US); Deborah Bartles, Vancouver, WA (US); John Tomczyk, Shoreview, MN (US)

(73) Assignee: Travel Tags, Inc., North Mankato, MN (US)

(*) Notice: Subject to any disclaimer, the term of this patent is extended or adjusted under 35 U.S.C. 154(b) by 0 days.

(21) Appl. No.: 15/585,953

(22) Filed: May 3, 2017

(65) Prior Publication Data
US 2017/0323191 A1 Nov. 9, 2017

Related U.S. Application Data

(60) Provisional application No. 62/331,016, filed on May 3, 2016.

(51) Int. Cl.
*G06K 19/02* (2006.01)
*G06K 19/073* (2006.01)
*G06K 19/18* (2006.01)
*G06K 19/077* (2006.01)
*G06K 19/06* (2006.01)

(52) U.S. Cl.
CPC . *G06K 19/07381* (2013.01); *G06K 19/06028* (2013.01); *G06K 19/07722* (2013.01); *G06K 19/18* (2013.01)

(58) Field of Classification Search
CPC .......... G09F 3/0292; G09F 2003/0222; G09F 2003/0227; G09F 2003/0272; G09F 2003/0277; G09F 3/0341; B42D 25/00; G06Q 20/354
USPC ......................................................... 235/488
See application file for complete search history.

(56) References Cited

U.S. PATENT DOCUMENTS

| | | |
|---|---|---|
| 3,288,281 A | 11/1966 | Sparks |
| 3,773,251 A | 1/1973 | Hadick |
| 4,939,992 A | 7/1990 | Bird |
| 5,275,285 A | 1/1994 | Clegg |
| 5,419,433 A | 5/1995 | Harrer et al. |

(Continued)

OTHER PUBLICATIONS

SlingShot CD Package, 2 pages, c. 2000.
(Continued)

*Primary Examiner* — Thien M Le
(74) *Attorney, Agent, or Firm* — Patterson Thuente Pedersen, P.A.

(57) ABSTRACT

A stored value card and carrier assembly including a carrier formed from one or more panels, at least one stored value card sandwiched and sealed within the carrier, and a label removably adhered or coupled to the card and adhered or coupled to an interior of the carrier such that the bond to the carrier or card is greater than the bond to the other of the card or carrier. The label includes at least a portion of activation indicia, such as a barcode, either printed or otherwise applied thereon. Upon removal of the card from the carrier, the label remains coupled to one of the carrier or the card, whichever bond is greater, rending any remaining activation indicia on the other of the stored value card or carrier unreadable.

20 Claims, 8 Drawing Sheets

(56) References Cited

U.S. PATENT DOCUMENTS

| | | | |
|---|---|---|---|
| 5,489,123 A | 2/1996 | Roshkoff | |
| 5,493,801 A | 2/1996 | James | |
| 5,544,741 A | 8/1996 | Fantone et al. | |
| 5,588,526 A | 12/1996 | Fantone et al. | |
| 5,609,253 A | 3/1997 | Goade, Sr. | |
| 5,650,209 A | 7/1997 | Ramsburg et al. | |
| 5,660,925 A * | 8/1997 | Cooley | G09F 3/0292 428/195.1 |
| 5,760,381 A | 6/1998 | Stitch et al. | |
| 5,782,347 A | 7/1998 | Fantone et al. | |
| 5,791,474 A | 8/1998 | Hansen | |
| 5,833,068 A | 11/1998 | Fantone | |
| 5,850,913 A | 12/1998 | Fantone et al. | |
| 5,851,630 A | 12/1998 | Davis, II | |
| 5,918,909 A | 7/1999 | Fiala et al. | |
| 5,941,382 A | 8/1999 | Fantone et al. | |
| 6,109,439 A | 8/2000 | Goade | |
| 6,178,426 B1 * | 1/2001 | Klein | G06F 17/30879 |
| 6,179,119 B1 | 1/2001 | Manoogian | |
| 6,224,108 B1 | 5/2001 | Klure | |
| 6,245,382 B1 | 6/2001 | Shvartsman et al. | |
| 6,253,820 B1 * | 7/2001 | Landan | B65C 1/025 156/542 |
| 6,286,999 B1 * | 9/2001 | Cappel | B65D 33/065 24/400 |
| 6,328,341 B2 | 12/2001 | Klure | |
| 6,349,928 B1 | 2/2002 | Matheis et al. | |
| 6,439,613 B2 | 8/2002 | Klure | |
| 6,454,165 B1 | 9/2002 | Dawson | |
| 6,481,994 B1 | 11/2002 | McCannel et al. | |
| 6,520,329 B1 | 2/2003 | Fuchs | |
| 6,543,809 B1 | 4/2003 | Kistner et al. | |
| 6,588,591 B1 | 7/2003 | Schabert et al. | |
| 6,601,415 B2 | 8/2003 | Takinami | |
| 6,640,974 B2 | 11/2003 | Malone | |
| 6,715,795 B2 | 4/2004 | Klure | |
| 6,957,737 B1 | 10/2005 | Frederickson et al. | |
| 6,964,810 B2 | 11/2005 | McCannel et al. | |
| 7,117,512 B1 | 10/2006 | Cahill | |
| 7,219,829 B2 | 5/2007 | Treat | |
| 7,222,797 B2 | 5/2007 | Davilla et al. | |
| 7,300,535 B2 | 11/2007 | McCannel et al. | |
| 7,537,168 B2 | 5/2009 | Anderson et al. | |
| 7,658,282 B2 | 2/2010 | Costel | |
| 7,681,732 B2 | 3/2010 | Moehlenbrock et al. | |
| 7,726,477 B1 | 6/2010 | Gaither | |
| 8,292,072 B2 | 10/2012 | Corey et al. | |
| 8,419,889 B2 | 4/2013 | Smith | |
| 8,833,553 B2 | 9/2014 | Corey et al. | |
| 8,944,470 B2 | 2/2015 | Mayrhofer et al. | |
| 2002/0088855 A1 | 7/2002 | Hodes | |
| 2002/0157973 A1 | 10/2002 | Preisler | |
| 2003/0004889 A1 | 1/2003 | Fiala et al. | |
| 2003/0018586 A1 | 1/2003 | Krahn | |
| 2003/0028439 A1 | 2/2003 | Cox | |
| 2003/0080013 A1 | 5/2003 | Smith | |
| 2003/0150762 A1 * | 8/2003 | Biller | B65D 73/0028 206/461 |
| 2003/0234191 A1 | 12/2003 | Belden, Jr. et al. | |
| 2004/0008613 A1 | 1/2004 | Beckwith et al. | |
| 2004/0151880 A1 | 8/2004 | Nakamura et al. | |
| 2005/0045503 A1 | 3/2005 | Wong et al. | |
| 2005/0045732 A1 * | 3/2005 | Whitaker | A45C 11/182 235/493 |
| 2005/0199516 A1 | 9/2005 | Laarman | |
| 2005/0205442 A1 | 9/2005 | Spagna | |
| 2005/0279143 A1 | 12/2005 | Belden, Jr. et al. | |
| 2005/0279825 A1 | 12/2005 | Ashby et al. | |
| 2006/0207896 A1 | 9/2006 | Shiga | |
| 2006/0246984 A1 * | 11/2006 | Walker | G07F 17/32 463/16 |
| 2006/0256413 A1 | 11/2006 | Kitamura | |
| 2007/0144044 A1 | 6/2007 | Kershner et al. | |
| 2007/0278114 A1 | 12/2007 | Kane et al. | |
| 2008/0030864 A1 | 2/2008 | Gougeon et al. | |
| 2008/0088126 A1 | 4/2008 | Hoffman | |
| 2008/0088931 A1 | 4/2008 | Hoffman | |
| 2008/0116089 A1 | 5/2008 | Roberts | |
| 2008/0150174 A1 | 6/2008 | Raymond et al. | |
| 2008/0213528 A1 | 9/2008 | Hoffman | |
| 2009/0078570 A1 | 3/2009 | Smith | |
| 2009/0107862 A1 | 4/2009 | Pascua et al. | |
| 2009/0277808 A1 | 11/2009 | Payne | |
| 2010/0193583 A1 | 8/2010 | Tartavull et al. | |
| 2010/0213092 A1 | 8/2010 | Swain | |
| 2010/0224516 A1 * | 9/2010 | Abell | B42D 15/045 206/307 |
| 2011/0031148 A1 | 2/2011 | Rosendall et al. | |
| 2011/0132783 A1 | 6/2011 | Williams et al. | |
| 2012/0145578 A1 | 6/2012 | Pazlar et al. | |
| 2012/0273576 A1 | 11/2012 | Tomczyk et al. | |
| 2013/0068642 A1 | 3/2013 | Corey et al. | |
| 2013/0294602 A1 * | 11/2013 | Huxham | H04L 63/0428 380/255 |
| 2016/0005031 A1 * | 1/2016 | O'Regan | G06F 21/86 705/65 |
| 2016/0031624 A1 | 2/2016 | Pascua et al. | |
| 2016/0332789 A1 * | 11/2016 | Yerecic | B65D 55/024 |
| 2017/0243098 A1 | 8/2017 | Pascua et al. | |
| 2017/0323191 A1 | 11/2017 | Pascua et al. | |
| 2018/0079248 A1 | 3/2018 | Pascua et al. | |

OTHER PUBLICATIONS

Introducing RiverBorne™ Communications, 17 pages, c. 2000.
Printout of various lenticular packaging options, 3 pages, at least as of Nov. 13, 2009.
Application and File history for U.S. Appl. No. 15/439,743, filed Feb. 22, 2017. Inventors: Pascua et al.
Application and File history for U.S. Appl. No. 15/711,766, filed Sep. 21, 2017. Inventors: Pascua et al.

* cited by examiner

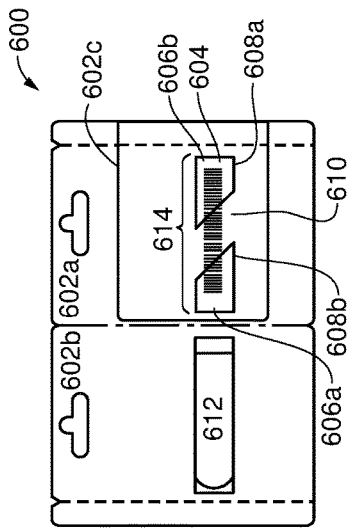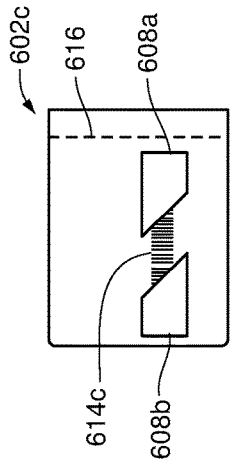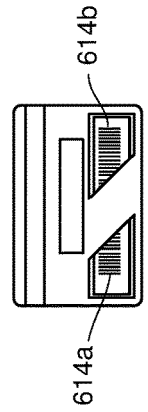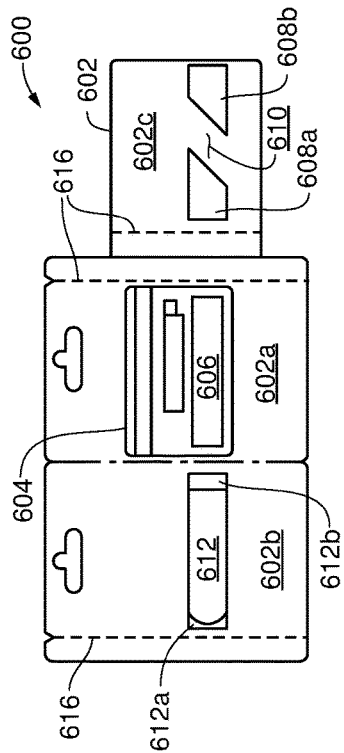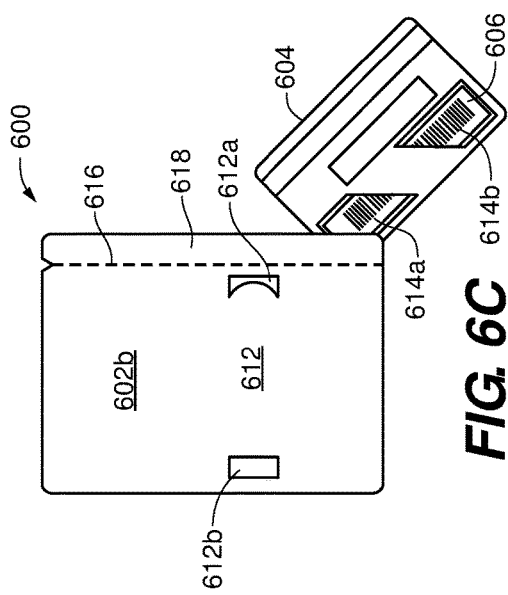
FIG. 6A
FIG. 6B
FIG. 6D
FIG. 6E
FIG. 6C

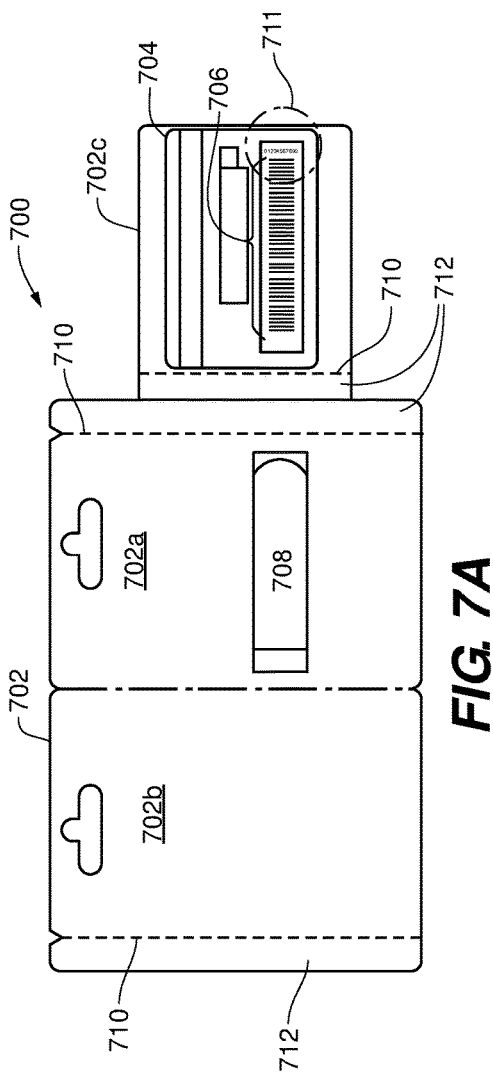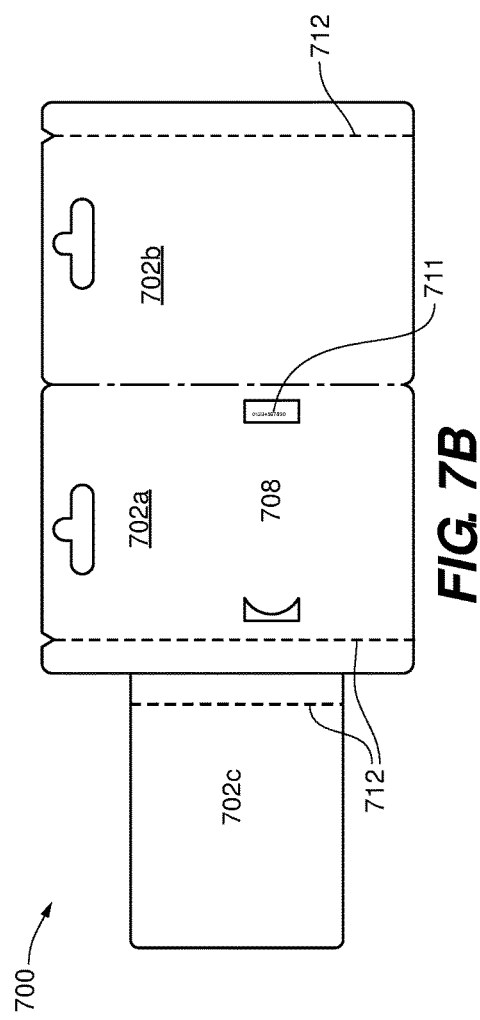

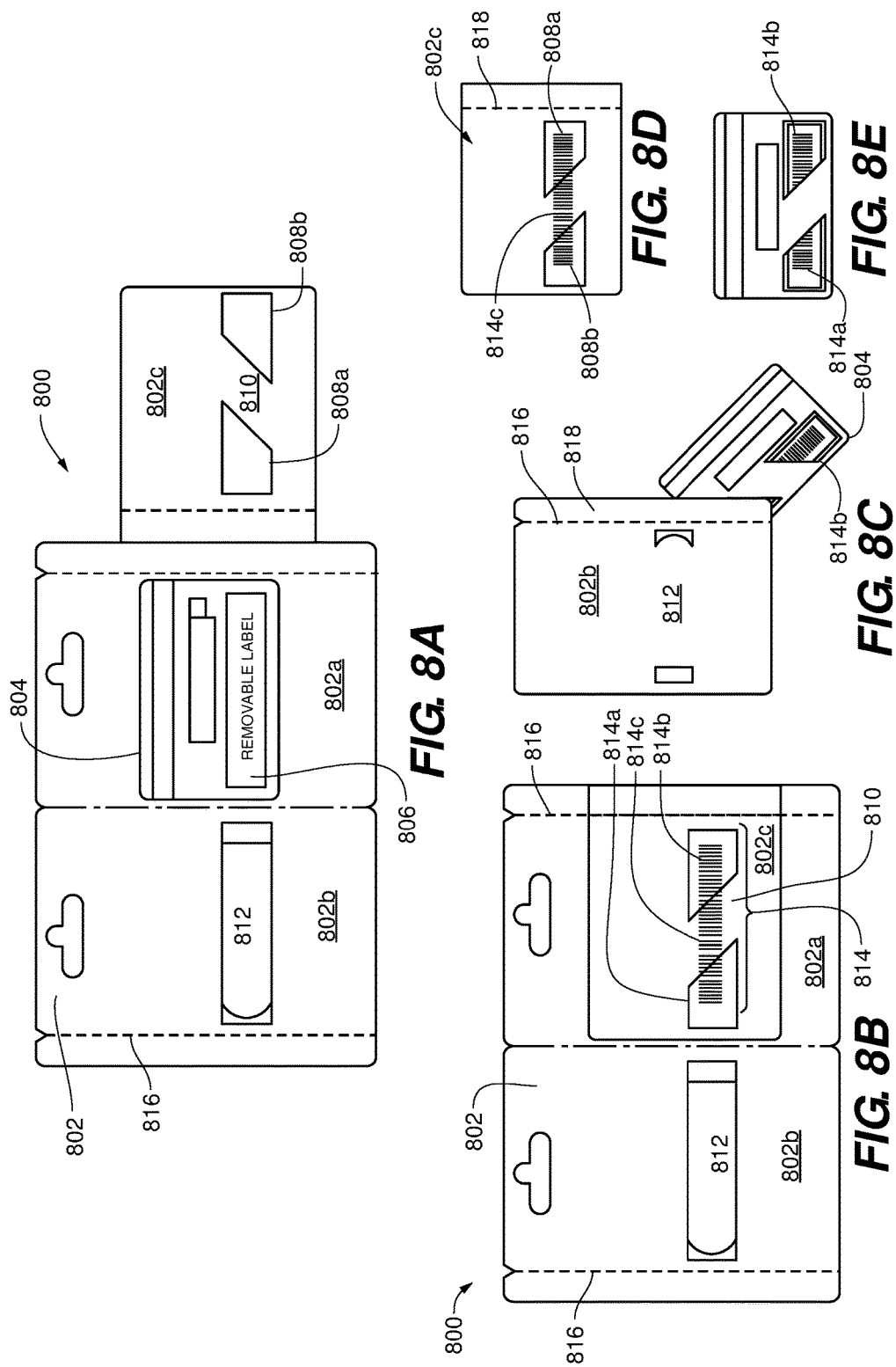

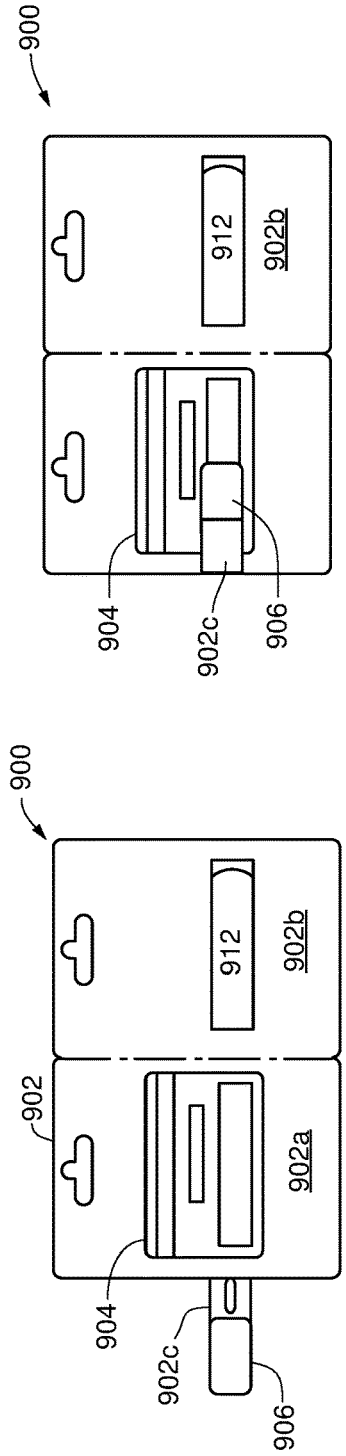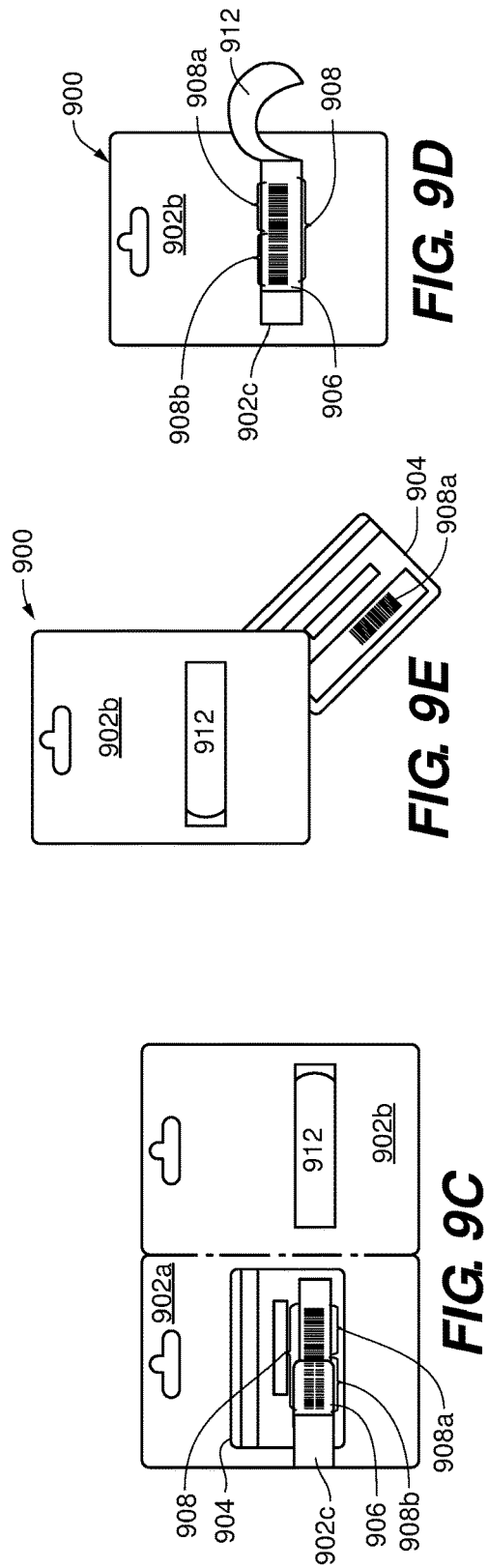

STORED VALUE CARD AND CARRIER ASSEMBLY WITH TAMPER EVIDENT LABEL

RELATED APPLICATION

The present application claims the benefit of U.S. Provisional Application No. 62/331,016 filed May 3, 2016, which is hereby incorporated herein in its entirety by reference.

TECHNICAL FIELD

This application relates generally to stored value cards, and more particularly relates to a assembly used for securing activation data within a secure package for stored value cards, the assembly being configured to destroy a portion of the activation barcode should a stored value card be removed from the package for fraudulent purposes.

BACKGROUND

Stored value cards, which may also be known as gift cards, prepaid cards, shopping cards or fare cards, prepaid Mastercard™ and Visa™ cards (instant issue) among other names, are very popular with both consumers and retailers. The wide appeal of stored value cards, as a result, has attracted the unwelcome attention of criminals seeking to exploit the conveniences and automated processes afforded by such cards. In particular, such criminals misappropriate and manipulate stored value cards and associated account information to perform fraudulent transactions. Stored value card fraud is typically perpetrated in the form of either at the physical point of sale (POS) or "card present" fraud, or for virtual POS purchases or "card not present" (CNP) fraud. The latter includes transactions such as in e-commerce or internet purchases that cannot be authenticated using "standard" processes used at the physical POS.

A stored value card is typically the size and shape of a conventional credit card (CR80 Card) and includes a magnetic stripe, barcode or other similar activation method, account identifying element, or means for using the card. The stripe, code, account identifying element, etc. on the card is encoded with data, which includes a unique account number. The account activation indicia, for example, may be visible while the card is secured in or secured to packaging, such that the account activation indicia may be used during the purchase and activation of the card.

Commonly, stored value cards are displayed by retailers for purchase by customers. The cards may be stored in an active or inactive state. If stored in an inactive state, the card cannot be used to purchase goods or services until the card has been activated. A customer may have a card activated by bringing a card to a cashier and having the cashier then, for example, swipe the card through a point of sale terminal, which may add value to the card in exchange for payment, or activate value already on the card. In this context, the "swipe" action could involve passing a card (or its packaging) though a magnetic strip reader/writer; or passing the card or package over a barcode scanner; or putting the card or package in the vicinity of a proximity reader/writer (such as, for example, an RFID reader/writer), or any other equivalent activation technique. A balance on the card may be maintained within a computer system located at the point of sale or at a remote location. A holder of the stored value card may then use the card to purchase goods and/or services immediately or over time up to the value of the card. These current procedures relating to stored value cards, although providing convenience to consumers, leave the cards vulnerable to criminals.

One particular fraud that is perpetuated by criminals with regard to stored value cards is called "skimming." Skimming is a serious problem resulting in significant loss to both retailers and consumers, and applies to both card present and CNP fraud. To skim a card having a magnetic stripe holding account information, for example, a criminal will purchase a stored value card from a retailer, thereby causing an account associated with the card to become activated. The criminal will then remove additional cards from the store that have not yet been activated, and will then alter magnetically stored information on the inactivated cards to match that of the activated card. As such, all of the altered, inactivated cards will have the magnetic information that identifies the account of the originally purchased card. The criminal will then return the altered cards to the store shelf where unsuspecting customers seeking to purchase a stored value card will unknowingly place money into the account of the criminal holding the originally purchased card. The unsuspecting customer may attempt to use their card and will be told that it has no associated value or has a smaller value than thought. The retailer may be able to verify that the customer did not use the value associated with the stored value card, and in the interest of customer service, may restore the value to the customer. In that case, the retailer loses the money. However, in some cases, there may be no way to prove fraud and the customer may lose up to the entire value.

Another type of fraud that is perpetrated by criminals with regard to stored value cards is unauthorized activation. Specifically with secure packaging, activation indicia, such as a barcode, is printed on the card and positioned beneath a perforated pull tab. Account information, such as a PIN or account number, is also on the card and sealed within package. Fraud is perpetrated when a criminal takes a stored value package from a retailer without purchasing the card. The criminal will then carefully remove the card from the package, and steal account information from the card and either replace the card within the package or with another card with an activation barcode, and carefully reseal the pack. The criminal rehangs or replaces the package at the retailer location. The criminal then waits until package is sold by visually checking if pack is still on rack or attempts to check balance online. An unsuspecting customer then purchases the package and activates the stored value card, unknowingly placing money into the account of the criminal holding the originally purchased card or with access to the original account information. The unsuspecting customer may attempt to use their card and will be told that it has no associated value or has a smaller value than thought.

Another fraud perpetuated by criminals is carried out by the criminal viewing stored value cards in the store. The criminal writes down the code associated with the particular stored value card (such as a credit card type number) while it is still in the store. In such situations the code is in plain view of the criminal or may be easily viewed without altering the card packaging. Once the criminal has recorded the code, the criminal waits for a period of time, assuming that an unsuspecting customer will purchase and have the card activated during that time. The criminal then periodically checks to see if they are able to make purchases, such as online purchases (CNP fraud), by attempting to use the card code. If the card has been activated by the true purchaser, the criminal will be able to purchase goods online using the activated code, thereby stealing the balance on the card from the true purchaser.

Criminals may perpetuate the above-described frauds or other frauds with regard to stored value cards as they sit on store shelves today. Thus, there is a need for a way to protect such cards and insure that they have not been tampered with or duplicated prior to purchase or activation by an innocent consumer.

There have been proposals and attempts to reduce the occurrence of fraud associated with stored value cards. For example, modifications to card readers or other parts of the activation process have been proposed, but changing existing systems in such ways involves significant cost. Additional steps have been added to the activation process for some cards, such as steps involving pin numbers and web access. However, additional steps reduce the level of convenience that such cards provide to consumers.

Other attempts at reducing the occurrence of fraud include packaging of the card such that unauthorized tampering with the packaging or card therein is visually evident. Examples of these types of secure packs can include, for example, sealing the card, sensitive information concerning the card, or combinations thereof within a single or multi-panel carrier such that a breach of the package destroys the carrier. However, these packages have been vulnerable to breach by the use of a sharp instrument, such as a razor blade, to slice open the package at its sealed edge. The card and/or information are then accessed for skimming purposes, and the package is resealed, without evidence that it has been compromised.

Therefore, there remains a need for a way to prevent fraud relating to stored value cards that is effective, and inexpensive to implement, while at the same time not negating the convenience of stored value cards.

SUMMARY OF THE INVENTION

Embodiments of the inventions are directed to a stored value card and carrier assembly which includes a carrier formed from one or more panels, at least one inactive or active stored value card sandwiched and sealed within the carrier, and a label removably or permanently adhered or coupled to the card and/or permanently adhered or coupled to an interior of the carrier such that the bond to the carrier is greater than the bond to the card. The label may include a portion or an entirety of activation indicia, such as a barcode, either printed or otherwise applied thereon. In embodiments in which only a portion of the activation indicia is applied to the label, the remaining indicia is applied directly to the card, the carrier, or both.

In the event the card is removed from the carrier, the label remains coupled to the interior of the carrier and releases from the card such that any activation indicia remaining on the card, the carrier, and/or the label by itself is rendered unreadable by the cashier or scanner, such as a barcode scanner, thereby indicating evidence of tampering and a potentially compromised package. In embodiments in which the entirety of the activation indicia is applied to the label, the activation indicia is not scannable without accessing the interior of the carrier, such access indicating tampering. In yet other embodiments, if a portion of the activation indicia is printed on the carrier, the label with the remaining activation indicia remains coupled to the card, such that the incomplete portions of the activation indicia on the carrier and the card are rendered unreadable by themselves.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIGS. 6A-6E depicts a secure card and carrier assembly with removable label in accordance with an embodiment, in which—

FIG. 6A is an unfolded view of the card and carrier assembly before imaging,

FIG. 6B is a partially folded view of the assembly after imaging,

FIG. 6C is a folded view of the carrier assembly with the card removed from the assembly, FIG. 6D is a plan view of an imaged inner panel of the assembly, and FIG. 6E is a rear view of the imaged card of the assembly;

FIG. 7A is an unfolded internal view of a card and carrier assembly according to another embodiment;

FIG. 7B is an unfolded external view of the card and carrier assembly of FIG. 7A;

FIGS. 8A-8E depicts a secure card and carrier assembly with removable label in accordance with an embodiment, in which—

FIG. 8A is an unfolded view of the card and carrier assembly before imaging,

FIG. 8B is a partially folded view of the assembly after imaging,

FIG. 8C is a folded view of the carrier assembly with the card removed from the assembly, FIG. 8D is a plan view of an imaged inner panel of the assembly, and FIG. 8E is a rear view of the imaged card of the assembly; and FIGS. 9A-9E depicts a secure card and carrier assembly with removable label in accordance with an embodiment, in which—

FIG. 9A is an unfolded view of the card and carrier assembly before imaging,

FIG. 9B is a partially folded view of the assembly before imaging,

FIG. 9C is a partially folded view of the assembly after imaging,

FIG. 9D is a folded view of the carrier assembly with the card removed from the assembly, and FIG. 9E is a rear view of the imaged card assembly accessed for activation.

Figure 1:
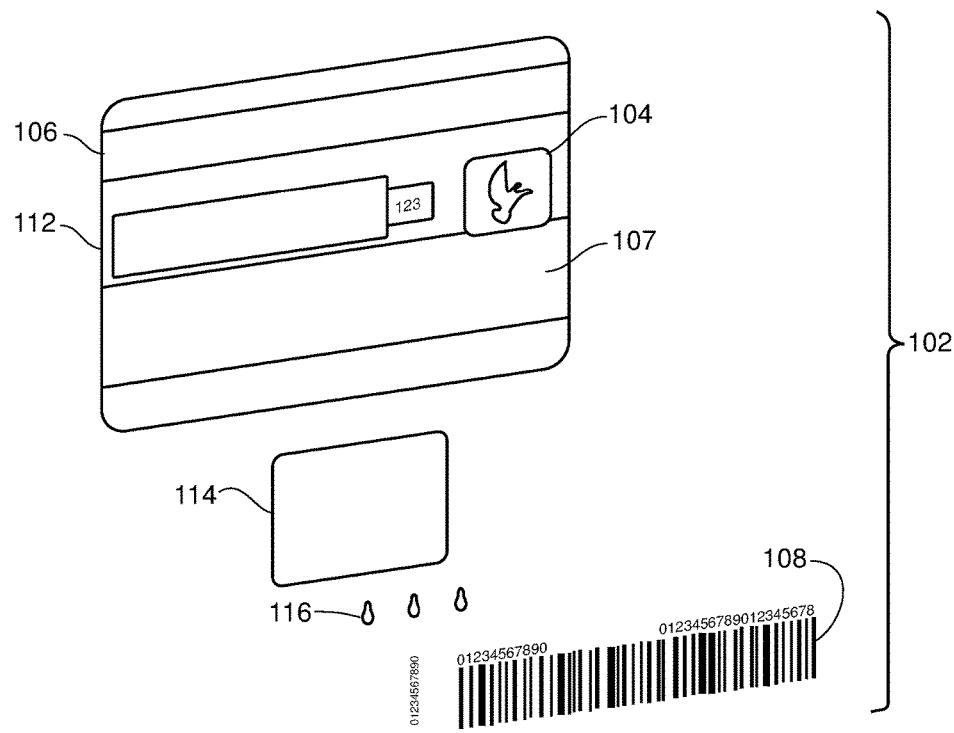
FIG. 1 is a rear exploded view of an exemplary card and label assembly in accordance with an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The embodiments described below are not intended to be exhaustive or to limit the invention to the precise forms disclosed in the following detailed description. Rather the embodiments are chosen and described so that others skilled in the art may appreciate and understand the entire disclosure.

In embodiments, a stored value card and carrier assembly employs one or more tamper evident labels and related methods. The label includes a portion or an entirety of the activation indicia, such as a barcode or QR code, either printed or otherwise applied thereon such that the activation indicia is complete and readable, such as by scanning. The label is secured to the card and the carrier, in which the bond to the carrier is stronger than the bond to the card. Upon removal of the card from the carrier, the label releases from the card, rendering the activation indicia unreadable or unscannable, and the card therefore cannot be activated, because the activation indicia or a portion thereof remains on the label secured within the carrier. In embodiments in which only a portion of the activation indicia is applied to the label, the remaining indicia is applied directly to the card, which is rendered incomplete and therefore unreadable when the label is removed.

In an alternative embodiment, a portion of the activation indicia is printed on a surface of the carrier and the remaining portion is printed on the label. When the label is positioned on the carrier, the activation indicia is complete and readable, such as by scanning. In this embodiment, the bond of the label to the card is stronger than to the carrier. Upon removal of the card from the carrier, the label remains coupled to the card, rendering the activation indicia portion printed on the label (and the remaining portion in the carrier) incomplete and unreadable such that the card, via scanning of the activation indicia of the carrier, cannot be activated.

Figure 2:
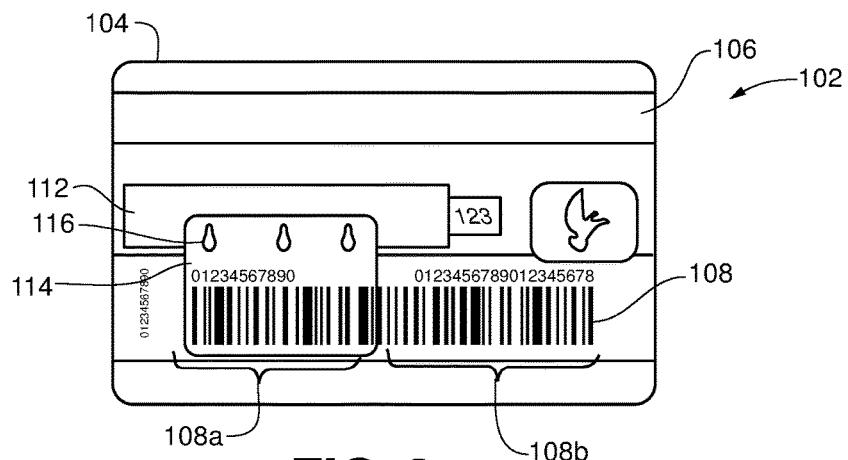
FIG. 2 is a rear assembled view of the card and label assembly of FIG. 1.

Referring now to FIGS. 1-4, an exemplary embodiment of a stored value card and carrier assembly 100 with tamper evident label is depicted. FIGS. 1 and 2 show a rear exploded and assembled view, respectively, of a card and label assembly 102 of assembly 100. An inactive or active stored value card assembly 102 includes card 104 having an account identifying element 106, such as a magnetic stripe, encoded with machine readable data, for metering transactions of an account, and an activation indicia field 107 containing activation indicia 108, such as a bar code. Activation indicia 108, if properly scanned or otherwise read at purchase, functions to activate the account tied to encoded machine readable data of element 106. Card 104 can further optionally include an account holder identifying element (not shown) such as an alphanumeric human and/or machine readable identifier embossed or printed on the card, and a signature panel 112. Other optional features can also be included on the stored value card, described in detail below.

A tamper evident label 114 is removably adhered to the card 104 in activation indicia field 107. Label 114 can be white, clear, foil, or any of a variety of colors and transparencies, and comprise a single or multi-ply poly label. An adhesive, such as a removable adhesive, covers at least a portion of an inner facing surface of label 114, which covers at least a portion of the activation indicia 108 printed thereon, without damaging card 104. In one embodiment, activation indicia 108 is completely printed (such as by drop on demand digital printing) or otherwise disposed on an outer facing surface of label 114. Activation indicia 108 on label 114, when coupled to card 104 is readable, such as by scanning, such that card 104 can be activated by a cashier upon purchase.

In another embodiment, as shown in FIG. 2, a first portion 108a of activation indicia 108 is printed or otherwise disposed on label 114, and a second remaining portion 108b is printed or otherwise disposed, on card 104. In this embodiment of the invention, label 114 is adhered to card 104, and then activation indicia portions 108a,108b are printed on label 114 and card 104 simultaneously such that exact positioning of label 114 is not required to complete activation indicia 108.

At least a portion of outer surface of label 114, with a portion or an entirety of activation indicia 108 applied thereto, also includes an adhesive 116, such as a permanent adhesive including hot glue, epoxy, radiation or moisture curable glue. For example, dots, stripes, coatings, or other patterns of a permanent adhesive are applied after and/or before printing of activation indicia 108. In yet another embodiment, ink used to form activation indicia 108 on label 114 doubles as a permanent adhesive that is activatable once applied to label 114.

As mentioned above, once label 114 and card 104 are assembled, activation indicia 108 is readable, such as by scanning, to activate the card upon purchase.

Figure 3:
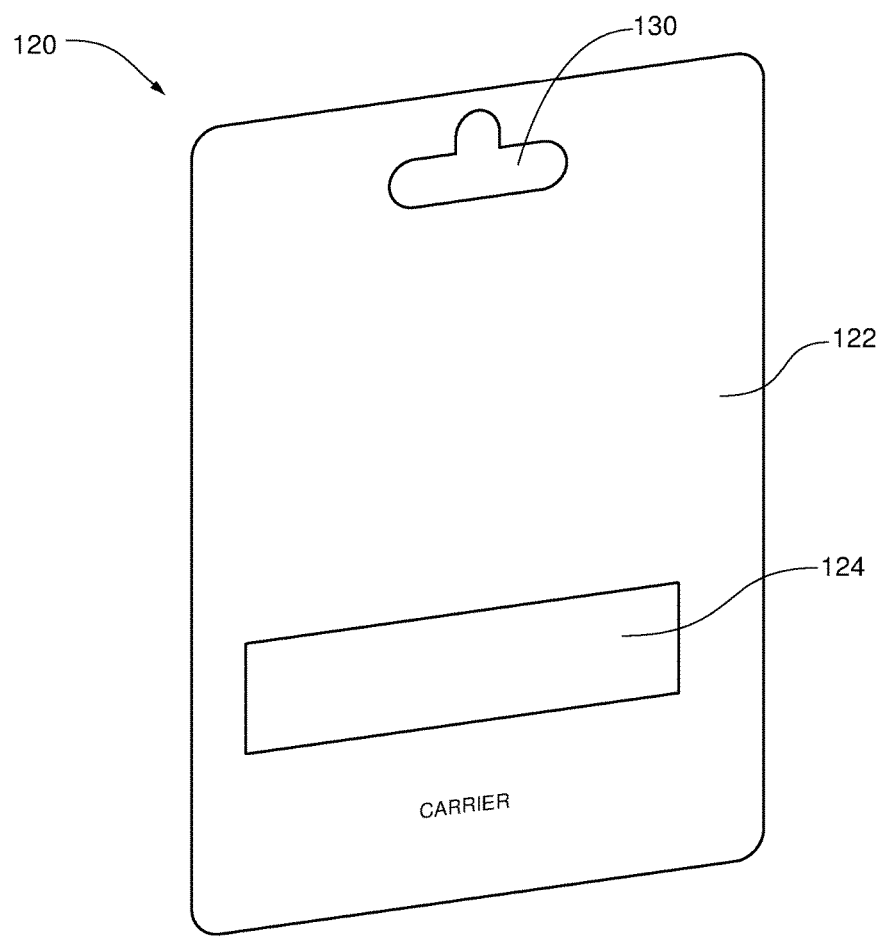
FIG. 3 is a rear view of a carrier in accordance with an embodiment.
Figure 4:
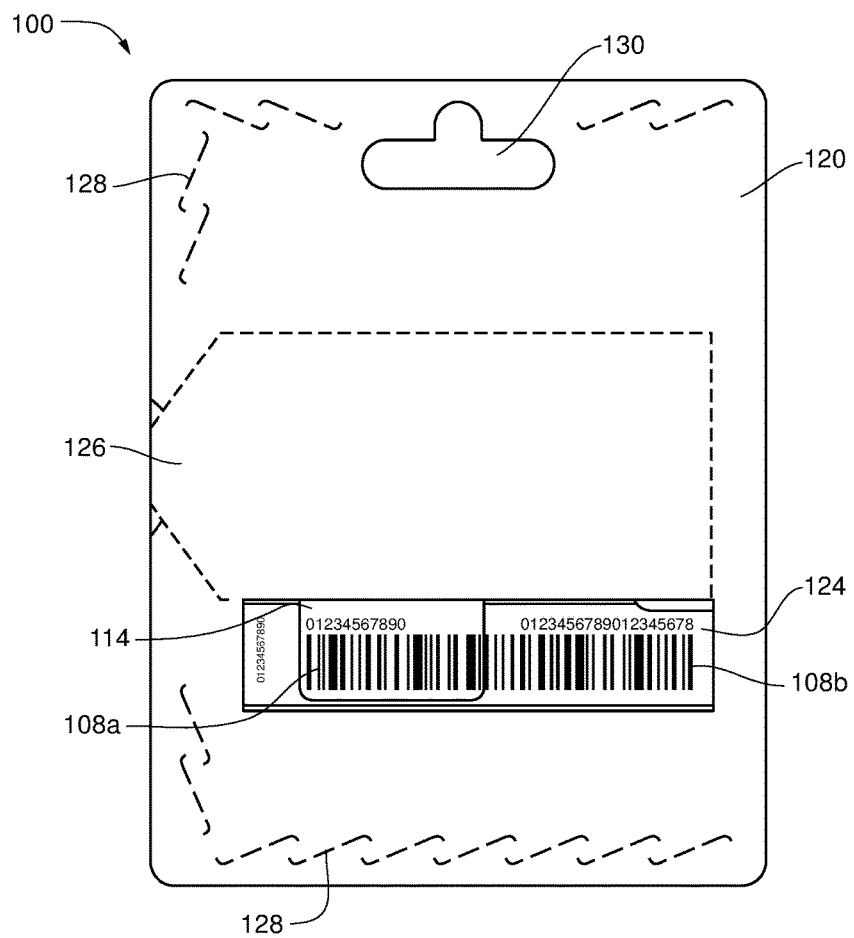
FIG. 4 is a rear assembly view of the card and label assembly of FIG. 1 within the carrier of FIG. 3.

Referring now to FIGS. 3 and 4, the card 104 is completely or partially enclosed within a carrier 120. Carrier 120 can comprise a single hinged panel 122 folded over to enclose card 104, or can comprise two or more panels secured together such as by heat sealing, ultrasonic welding, corresponding physical protrusions (with or without adhesive), any of a variety of sealing means, or combinations thereof. Alternatively, card 104 is coupled to carrier 120 and not sandwiched between surfaces or panels of carrier 120. In this embodiment, card 104 is coupled to the carrier 120 via label 114.

Carrier 120, as illustrated, can comprise an optional opening or aperture 124 such that a portion of card 104, such as activation indicia 108, can be viewable therethrough, and an aperture 130 completely through the carrier that can be used to hang the carrier in a retail establishment display. The shapes of the apertures shown are exemplary only and other shapes are also contemplated.

As depicted in FIG. 4, carrier 120 can further comprise perforations or tabs, such as perforated tab 126 for accessing card 104. Tab 126 can be score cut or perforated such that tab 126 extends through an entirety of carrier 120, or can be kiss cut through only an inner portion, such that it is not evident on an exterior of carrier 120, yet provides a track for opening tab 126. Carrier 120 can further comprise perforated designs or burst patterns 128 to provide further tamper evident features. For example, patterns 128 can rupture upon breach of carrier 120, thereby indicating tampering.

In an embodiment, and as depicted in FIG. 4, card 104 is completely secured within carrier 120 as shown. Complete enclosure provides the most protection from fraud for card 104. In alternative embodiments (not shown), the card can be partially enclosed within the carrier. As depicted in FIG. 4, label 114 is removably adhered to card 104 and a portion is permanently or destructively adhered to carrier 120. In this embodiment, when assembled, activation indicia 108 is viewable through aperture 124, and upon purchase, can be easily scanned or otherwise read by a cashier, to activate card 104 and the associated account without opening carrier 120.

When card 104 is removed from carrier 120, such as before purchase and activation or after purchase and activation, label 114 remains secured to carrier 120, while releasing from card 104 such that only portion 108b of activation indicia 108 remains on card 104, and is therefore rendered unreadable for activation purposes or methods. Alternatively, if activation indicia 108 is entirely printed on label 114, no activation indicia 108 is accessible on card 104 when removed from carrier 120. In the event that the card has already been purchased and activated, activation indicia 108 is no longer needed. However, before purchase and activation, card 104 cannot be activated fraudulently and/or there is visual evidence that card 104 has been tampered with and may be compromised, thereby reducing the occurrence of fraud.

Figure 5A:
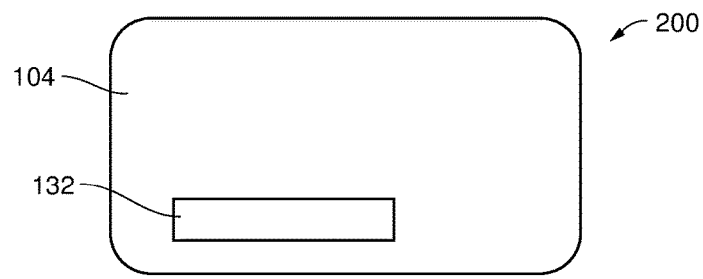
FIGS. 5A-5D is a rear assembled view of a card and label assembly according to another embodiment of the invention.
Figure 5B:
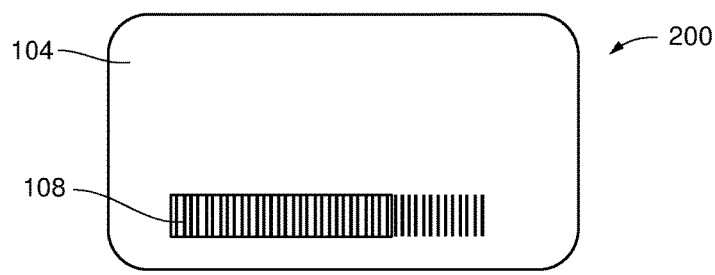
Figure 5C:
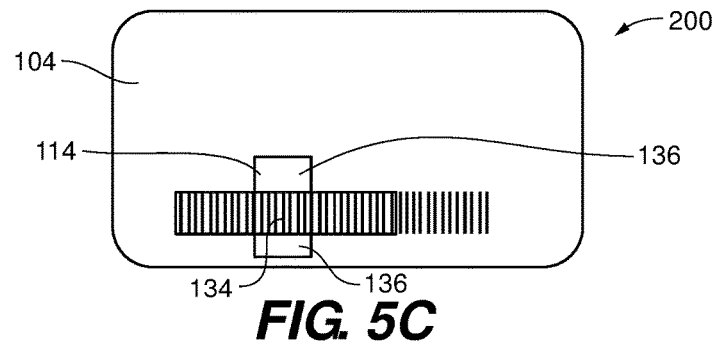

In another embodiment of the invention, and referring now to FIGS. 5A-5D, card and label assembly 200 includes a release coating 132 applied directly to card 104. Activation indicia 108 is printed directly on card 104 over release coating 132, and extending beyond release coating 132. Label 114 with adhesive 134 on an inner surface is applied over at least a portion of activation indicia 108, and is also secured to the carrier (not shown) via an adhesive 136 on the outer surface of label 114 to secure card 104 to the carrier. In one particular embodiment, and as depicted in FIG. 5C, adhesive 134 is applied to the inner surface of label 114 only in a region that covers activation indicia 108, and permanent adhesive 136 is applied to an outer surface of label 114 in portions outside of activation indicia 108; however, one or ordinary skill in the art would recognize that any of a variety of configurations is possible.

Figure 5D:
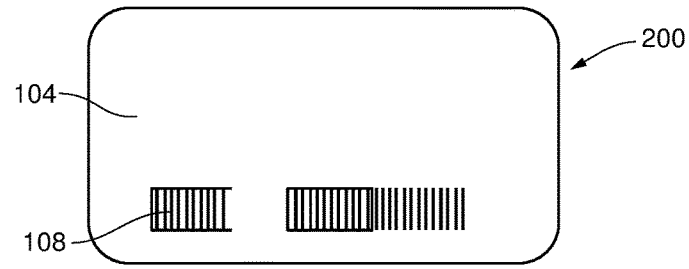

Referring to FIG. 5D, upon removal of card 104 from the carrier, adhesive 136 remains bonded to the carrier (not shown), and label 114 releases from card 104, pulling the activation indicia ink along with it, thereby rendering any remaining activation indicia on the card incomplete and unreadable.

In an alternative embodiment of the invention, a release coating is not present and instead a suitable ink, such as a drop on demand ink, is used to form activation indicia 108 and has release properties such that it functions as a release coating and activation 108 remains adhered to label 114 upon removal of label 114 from card 104.

Referring now to FIGS. 6A-6E, a card and carrier assembly 600 generally comprises a multi-panel carrier 602, at least one stored value cards 604, and a removable label 606 coupled to card 604. Referring to FIG. 6A, carrier 602 includes a first panel 602a, a second panel 602b, and an inner panel 602c having a first aperture 608a and a second aperture 608b separated from first aperture 608a by a portion 610 of panel 602c. Panels 602a, b, c can be foldable with respect to one another or discrete panels adhere or otherwise coupled together.

Card 604 with blank removable label 606, i.e. a removable label having no or partial activation indication imaged thereon, is coupled to first panel 602a. Panel 602b can optionally include a perforated or scored pull tab 612 for accessing card 604 in the region of label 606 for activation purposes, which will be described in more detail below.

Referring to FIG. 6B, in which the panels are foldable with respect to one another for exemplary purposes only, inner panel 602c is folded over to cover card 604 such that portions 606a and 606b of label 606 are viewable through apertures 608a and 608b, while portion 610 of panel 602c obscures a central portion 606c of label 606. Referring to FIGS. 6B, 6D, and 6E, portions 606a,b of label 606 and portion 610 of panel 602c are then imaged simultaneously with human and/or machine readable activation indicia 614, e.g. a barcode and/or alphanumeric characters, such that the entire activation indicia 614 extends over portions 606a,b of label 606 and portion 610 of panel 602c. Only partial portions 614a,b,c of activation indicia 614 are deposited on each portion 606a,b, and 610, respectively, such that each partial portion of activation indicia 614, is unreadable individually and card 604 cannot be activated.

Referring to FIG. 6C, when assembled, inner panel 602c and card 604 with label 606 are sandwiched and secured between first and second panels 602a,b. In use, to activate card 604, pull tab 612 is pulled open via tab aperture 612a and hinge aperture 612b to access complete activation indicia 614. Referring back to FIG. 6A in combination with 6C, panels 602a,b of carrier 602 can also included separating means 616, such as perforations, scores, die cuts, kiss cuts, or the like, that when carrier 602 is assembled, form tear strip 618 along an edge thereof. Panel 602c can also optionally include separating means for separating panel 602c from remaining carrier panels 602a and/or 602b. Tear strip 618 can be removed or separated from remaining carrier 602 to allow access to card 604 for removing card 604 after purchase and activation.

However, as depicted in FIG. 6C, if card 604 is removed from carrier 602 before activation, activation indicia 614 is disrupted as only partial portions 614a,b of activation indicia 614 are available to be read and therefore card 604 cannot be activated. Even if portions 614a, b are reproduced, it would be difficult to replace a new card back within carrier 602 without breaching carrier 602 with the alignment necessary to form a complete and readable activation indicia 604.

Referring now to FIGS. 7A and 7B, a card and carrier assembly 700 includes a multi-panel carrier 702 and a card 704 having activation indicia 706 imaged on a removable label 707 placed on card 704. As described above, carrier 702 can include first and second panels 702a,b and an inner panel 702c. First panel 702a includes a perforated or scored pull tab 708 for accessing activation indicia 706 of card 704 in the region of for activation purposes. Panels 702a,b and optionally 702c can include separating means 710 for forming tear strips 712 as described above with respect to assembly 600.

Card 704 is coupled to inner panel 702c, which is then folded over to sandwich panel 702c and card 704 between panels 702a,b. To activate card 704, pull tab 708 is pulled back to reveal activation indicia 706. In most instances, human readable data, such as an alphanumeric sequence, is imaged under machine readable indicia, such as a bar code, which is related to or is an alternative to the machine readable indicia. For example, if the machine readable indicia is not readable, the alphanumeric code can be entered manually to active. However, in this embodiment, complete activation indicia 706 of card 704 includes only machine-readable indicia, such as a barcode, with partial to no human readable indicia related to or which can otherwise be used to reconstruct activation indicia 706. For example, card 704 may include a human readable tracking number 711 that is unrelated to activation indicia 706. By not including human readable indicia associated with machine readable activation indicia 706, it will be more difficult to reproduce a label with the entire activation indicia and place it on a card to commit fraud.

Referring now to FIGS. 8A-8E, a card and carrier assembly 800 generally comprises a multi-panel carrier 802, at least one stored value cards 804, and a removable label 806 coupled to card 804, almost identical to the embodiment of FIGS. 6A-6E above, and corresponding reference numbers are used without repeating the description. In this embodiment, however, card 804 includes only machine-readable complete activation indicia 814, such as a barcode, with partial to no human readable indicia related to or which can otherwise be used to reconstruct activation indicia 814, as described in the embodiment of FIGS. 7A,B. For example, card 804 may include a human readable tracking number that is unrelated to activation indicia 814. By not including human readable indicia associated with machine readable activation indicia 814 in combination with the label and carrier combination, it will be more difficult to reproduce a label with the entire activation indicia and place it on a card to commit fraud.

Referring now to FIGS. 9A-9E, a card and carrier assembly 900 generally comprises a multi-panel carrier 902, at least one stored value cards 904, and a label 906 coupled to carrier 902. Referring to FIG. 9A, carrier 902 includes a first panel 902a, a second panel 902b, and an inner panel 902c that is significantly smaller than panels 902a,b, and which extends from an edge of panel 902a. Label 906 is destructively coupled at a first end to a free end of panel 902c. Label 906 can be coupled via adhesive. Alternatively, label 906 and panel 902c can be constructed of a heat sealable material such that label 906 is heat sealed to panel 902c.

Card 904 having no activation indicia imaged thereon is coupled to first panel 902a. Panel 902b can optionally include a perforated or scored pull tab 912 for accessing card for activation purposes, which will be described in more detail below.

Referring to FIG. 9B, panel 902c with label 906 are folded over card 904, and panel 902c and label 906 are affixed to card 904, optionally with a releasable adhesive or glue so as not to permanently leave residue on card 904. Alternatively, label 906 can be coupled to card 904 using no adhesive, and is affixed to the card such as by static cling or other static or mechanical forces. Referring to FIG. 9C, once panel 902c and label 906 are affixed to card 904, activation indicia 908 is imaged onto card 904 and label 906 such that a first portion 908a is imaged directly on the card (or, if present, removable label coupled to the card), and a second portion 908b is imaged on label 906. Optionally, a third portion (not shown) can be imaged on panel 902c. Once folded, card 904 and panel 902c with label 906 are sandwiched between first and second panels 902a,b and pull tab 912 obscures activation indicia 908.

Referring now to FIG. 9D, to activate card 904, pull tab 912 is pulled back (or completely removed) to reveal activation indicia 908 including first and second portions 908a, b. Activation indicia 908 is scanned or otherwise read to activate card 904. Referring now to FIG. 9E, in the event card 904 is removed from assembly 900, label 906 with second portion 908b of activation indicia 908 remains adhered to the inner side of panel 902c. Card 904 then only includes incomplete first portion 908a such that scanning or otherwise reading first portion 908a does not activate card 904. Carrier 902 would then have to be opened to access second portion 908b, indicating tampering with assembly 900.

In yet another embodiment of the invention, the label described in any of embodiments above includes perforations. Upon removal of the card from the carrier, the mode of failure is the perforations rather than or in combination with the adhesive coupling the label to the card. A portion of the label, including some or all of the activation indicia, remains coupled to the card and separates from the remaining label, rendering any remaining activation indicia on the card incomplete and unreadable.

In yet another embodiment of the invention, the label comprises at least a two part label with a release coating or breakaway layer coupling first and second plies of the label. An adhesive couples the base ply of the label to the card. At least a portion of the activation indicia is printed on a surface (such as an inner surface) of the breakaway ply or layer of the label, while permanent adhesive couples the outer surface of the breakaway ply to the carrier. Upon removal of the card from the carrier, the base ply remains coupled to card, while the breakaway layer with at least a portion of activation indicia thereon remains coupled to the carrier, rendering any activation indicia on the card incomplete and unreadable.

In any of the embodiments described herein, a label as described can be additionally or alternatively applied to any other feature of the card, such as, for example, a PIN, card code verification number (CCV), account identifying element, or any of a variety of features or combinations thereof.

Additional tamper evident packaging and/or labeling can be also be combined with embodiments described above including tamper evident labels as described in U.S. patent application Ser. No. 15/439,743, filed Feb. 22, 2017, and entitled "Stored Value Card and Carrier System with Tamper Evident Label," which is incorporated herein by reference in its entirety, and U.S. Provisional Patent Application Nos. 62/397,907 filed Sep. 21, 2016; 62/406,319 filed Oct. 10, 2016; and 62/491,422 filed Apr. 28, 2017, all of which are entitled "Secure Packs for Transaction Cards," and all of which are incorporated by reference in their entireties.

The carriers of embodiments described herein can be formed from any of a variety of materials including, for example, paper, paper with a heat sealable or non-rewettable polymer layer mounted to the inside of the panel, polymeric materials such as heat sealable or non-rewettable polymers, other synthetic materials with or without heat sealable or non-rewettable polymer layer(s) mounted to the inside of the panel, or combinations thereof. The non-rewettable polymer or polymer layer(s) can include, for example, can comprise amorphous polyethylene terephthalate, PETG, polycarbonate, polyethylene, or combinations thereof, and can be clear, opaque (color or white), semi-opaque (color or white), or combinations thereof. The inner and/or outer layers or surfaces of the panels can printed, decorated, embellished, or otherwise adorned by any of a variety of means including, but not limited to, conventional and/or digital printing, metallization, foil lamination, foil stamping, embossing, and/or screen printing.

The details regarding the components of these embodiments of the stored value card and carrier assembly of the invention are described in detail below:

In general, stored value cards according to embodiments are forms of transaction instruments associated with transaction accounts, in which the stored value cards provide cash equivalent value that may be used within an existing payment/transaction infrastructure. Stored value cards are frequently referred to as gift, pre-paid or cash cards, in that money is deposited in an account associated with the card before use of the cards is allowed. In general, such an account may be used for transactions between a user and a merchant through any suitable communication means, such as, for example, a telephone network, intranet, the global, public Internet, a point of interaction device, online communications, off-line communications, wireless communications, and the like. They may also be used in person at any point of sale (automated or not) that accepts them. The type of stored value card may be a gift card, loyalty card, credit or debit card, health card, phone card, pre-paid phone card, membership card, identification card, ring tone card, or any other type of card. The stored value card may be any such transaction instrument associated with any such transaction account.

The stored value card is typically the size and shape of a conventional credit card (i.e., CR80), although other sizes and shapes are possible, such as, for example, card and carrier embodiments depicted and described in U.S. Patent Application Publication No. 2016/0031624, incorporated by reference in its entirety above. The stored value card is commonly made of plastic, wood, or paper, however other materials, such as other synthetic or natural materials are also contemplated.

As discussed above, the stored value card includes an account identifying element (e.g. 108), such as a magnetic stripe, radiofrequency identification (RFID), bar code, QR code, text (recognized by Optical Character Recognition (OCR)), and/or smart chip, for example. The account identifying element is encoded with data, which includes a unique account number. If the stored value card includes a magnetic stripe, that magnetic stripe may comprise a plastic film including tiny magnetic particles that can be magnetized in certain directions to record data on the card, which may be read by a card reader. If the stored value card includes a bar code, the bar code may comprise machine-readable data, which may be alpha-numeric. Bar code data includes black and white lines arranged to represent a series of numbers (e.g., a bar code comprising a Universal Product Code (UPC) has twelve digits) to a bar code scanner (printed account identifying elements). Other current or future developed account identifying elements are also possible. Also, more than one account identifying element may be included on the stored value card, and in any location.

The stored value card may include embossed or non-embossed features, such as an account number, card issuer name or logo, card holder's name, expiration date, etc. An account identifying element(s) on the stored value card may be embossed (including at least one raised portion (e.g., letters, designs), or protuberance, etc.), or non-embossed.

An advantage of the embodiments is that currently existing carriers and stored value cards may be used without modification. The tamper evident label may simply be added to current carriers and cards to prevent fraud. Therefore, the cost of implementing such a change to existing systems is low.

Another advantage is that the tamper evident label indicates tampering or fraud by rendering activation indicia on the card and/or label unreadable, while the label does not damage the card when removed. As a result, the card and carrier remain attractive for gift-giving purposes after activation.

Yet another advantage is that the tamper evident label provides adequate adhesion, destructibility and removability. The label is also advantageously able to adhere to both a paper printed surface and a plastic card, the bond with the carrier being stronger than the bond with the card such that upon removal of the card from the package, the label releases from the card while remaining adhered to the package, or vice versa in alternative embodiments.

Generally, in embodiments, a stored value card and carrier assembly can comprise a carrier, a stored value card, and a tamper evident label, a first surface of the label being adhered to the stored value card, and a second opposite surface being adhered to the carrier. The label can include at least a portion of activation indicia, the activation indicia being readable to activate the stored value card, and removal of the stored value card from the carrier causes the label to remain coupled to one of the carrier or the card, rendering any remaining activation indicia on the other of the stored value card or carrier unreadable. An entirety of the activation indicia can be disposed on the label, and removal of the card from the carrier causes the label to release from the card and remain coupled to the carrier such that the activation indicia is not present on the card. Alternatively, a first portion of the activation indicia is disposed on the label, and a second portion of the activation indicia is disposed on the card, and removal of the card from the carrier causes the label to release from the card and remain within the carrier such that the activation indicia on the card is incomplete and unreadable. In yet another alternative embodiment, a first portion of the activation indicia is disposed on the label, and a second portion of the activation indicia is disposed on the carrier, and removal of the card from the carrier causes the label to release from the carrier and remain on the card such that the activation indicia on the carrier is incomplete and unreadable.

In certain non-limiting embodiments, the first surface of the label includes a removable adhesive for adhering the label to the card, and the second surface of the label includes a permanent adhesive for adhering the label to the carrier. A bond between the label and the carrier is stronger than a bond between the label and the card. Preferably, the removable adhesive is removable from the card without damaging the card. In certain non-limiting embodiments, the assembly does not include any complete alphanumeric human readable indicia related to the activation indicia.

In other embodiments, a stored value card and carrier assembly can comprise a carrier, a stored value card sandwiched within the carrier, a label, of which a first surface of the label being adhered to the stored value card, and activation indicia. The label can include a first portion of activation indicia, and the carrier can include a second portion of the activation indicia, the activation indicia in its entirety being machine- and/or human-readable to activate the stored value card, and removal of the stored value card from the carrier causes the first portion of the activation indicia to remain coupled to the card via the label, rendering the second portion on the carrier unreadable to activate the card. In certain non-limiting embodiments, the carrier includes structure defining an aperture, in which the first portion of the activation indicia is viewable through the aperture, and the second portion of the activation indicia is adjacent the aperture such that the first portion and the second portion are aligned and readable to activate the card.

The label can further include a third portion of the activation indicia spaced apart from the first portion, in which the carrier includes structure defining a second aperture spaced apart from the first aperture via a portion of the carrier extending therebetween, the second portion of the activation indicia being printed on the portion of the carrier. The third portion of the activation indicia can be viewable through the second aperture. In certain non-limiting embodiments, the carrier can comprise a first panel, a second panel, and a third panel, the card being coupled to the first panel, and the third panel includes structure defining an aperture. The second portion of the activation indicia is disposed on the third panel adjacent the aperture, and, when assembled, the third panel is sandwiched between the first panel containing the card and the second panel and the first portion of the activation indicia is viewable through the aperture, and the first and second portions of the activation indicia are aligned and readable to activate the card. The label can further include a third portion of the activation indicia spaced apart from the first portion, and the third panel includes structure defining a second aperture spaced apart from the first aperture via a portion of the third panel extending therebetween, the second portion of the activation indicia being printed on the portion of the third panel. The third portion of the activation indicia can be viewable through the second aperture, and is aligned with the first and second portions such that the activation indicia is readable to activate the card.

In certain non-limiting embodiments, the second panel includes structure defining a pull tab such that, when assembled, the pull tab obscures the at least one of the first and second portions of the activation indicia, and is configured to be pulled back to reveal the activation indicia in its entirety. In certain non-limiting embodiments, the first, second and third panels each include structure defining a tamper evident tear strip portion, such that, when assembled, the carrier includes a tamper evident tear strip along a single edge of the carrier, the tear strip being configured to be destructively removed to allow access to the card within the carrier. In certain non-limiting embodiments, the assembly does not include any complete alphanumeric human readable indicia related to the activation indicia.

In yet other embodiments, a stored value card and carrier assembly can comprise a multi-panel carrier including a first panel, a second panel, and a third panel extending from an edge of the first panel, a stored value card positioned on the first panel, a label, of which a first portion of the label is coupled to the third panel, and the third panel is foldable onto the first panel and a second portion of the label is coupled the card positioned on the first panel. When assembled, the first and second panels sandwich the third panel and card therebetween. The assembly can further comprise activation indicia, and the label includes a first portion of the activation indicia deposited thereon, and the card includes a second portion of the activation indicia deposited thereon. When the assembly is assembled, the first and second portions are aligned and the activation indicia is readable to activate the stored value card, and removal of the stored value card from the carrier causes the label having the first portion thereon to remain coupled to the third panel, rendering the second portion of the activation indicia on the card unreadable.

In certain non-limiting embodiments, the label comprises a polymeric label, the first portion of the label being adhered via a permanent adhesive to a free end of the third panel, and wherein the second portion of the label is coupled, optionally via a removable adhesive to the card. In certain non-limiting embodiments, the label and the third panel comprises a non-rewettable polymeric material, and the first portion of the label is heat sealed to a free end of the third panel, and the second portion of the label is coupled, optionally via a removable adhesive, to the card. In certain non-limiting embodiments, the first panel and second panel are foldable relative to each other to form front and back panels of the assembly. Alternatively, the first panel and second panel are discrete panels that when assembly, are adhered to each other to form front and back panels of the assembly. In certain non-limiting embodiments, the second panel includes structure defining a pull tab, such that, when assembled, the pull tab is configured to obscure at least one of the first and second portions of the activation indicia, and the pull tab is configured to be pulled back to reveal the first and second portions of the activation indicia. In certain non-limiting embodiments, a third portion of the activation indicia is deposited on the third panel, the third portion being aligned with the first and second portions when the assembly is assembled such that the activation indicia is readable to activate the card.

Various embodiments of assemblies, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A stored value card and carrier assembly, the assembly comprising:
   a carrier;
   a stored value card; and
   a tamper evident label, a first surface of the label being adhered to the stored value card, and a second opposite surface being adhered to the carrier via an adhesive,
   wherein the label includes at least a portion of activation indicia, the activation indicia being readable to activate the stored value card,
   wherein the first surface of the label includes a removable adhesive for adhering the label to the card, and wherein the adhesive on the second surface of the label comprises a permanent adhesive for permanently adhering the label to the carrier, wherein a bond between the label and the carrier is stronger than a bond between the label and the card, and wherein the assembly is configured such that removal of the stored value card from the carrier without opening the assembly causes the label to remain coupled to the carrier, rendering the activation indicia unreadable.

2. The assembly of claim 1, wherein an entirety of the activation indicia is disposed on the label, and wherein the assembly is configured such that removal of the card from the carrier causes the label to release from the card and remain coupled to the carrier such that the activation indicia is not present on the card.

3. The assembly of claim 1, wherein a first portion of the activation indicia is disposed on the label, and a second portion of the activation indicia is disposed on the card, and wherein the assembly is configured such that removal of the card from the carrier causes the label to release from the card and remain within the carrier such that the activation indicia on the card is incomplete and unreadable.

4. The assembly of claim 1, wherein a first portion of the activation indicia is disposed on the label, and a second portion of the activation indicia is disposed on the carrier, and wherein the assembly is configured such that removal of the card from the carrier causes the label to release from the carrier and remain on the card such that the activation indicia on the carrier is incomplete and unreadable.

5. The assembly of claim 1, wherein the removable adhesive is removable from the card without damaging the card.

6. The assembly of claim 1, wherein the assembly does not include any complete alphanumeric human readable indicia related to the activation indicia.

7. A stored value card and carrier assembly, the assembly comprising:
a carrier;
a stored value card sandwiched within the carrier, wherein the carrier comprises a first panel, a second panel, and a third panel, the card being coupled to the first panel;
a label, a first surface of the label being adhered to the stored value card; and
activation indicia, wherein the label includes a first portion of activation indicia, and the carrier includes a second portion of the activation indicia, the activation indicia in its entirety being machine- and/or human-readable to activate the stored value card,
wherein the third panel includes structure defining an aperture, and the second portion of the activation indicia is disposed on the third panel adjacent the aperture,
wherein, when assembled, the third panel is sandwiched between the first panel containing the card and the second panel and the first portion of the activation indicia is viewable through the aperture, and the first and second portions of the activation indicia are aligned and readable to activate the card, and
wherein the assembly is configured such that removal of the stored value card from the carrier causes the first portion of the activation indicia to remain coupled to the card via the label, rendering the second portion on the carrier unreadable to activate the card.

8. The assembly of claim 7, wherein the carrier includes structure defining an aperture, wherein the first portion of the activation indicia is viewable through the aperture, and wherein the second portion of the activation indicia is adjacent the aperture such that the first portion and the second portion are aligned and readable to activate the card.

9. The assembly of claim 8, wherein the label includes a third portion of the activation indicia spaced apart from the first portion,
wherein the carrier includes structure defining a second aperture spaced apart from the first aperture via a portion of the carrier extending therebetween, the second portion of the activation indicia being printed on the portion of the carrier, and
wherein the third portion of the activation indicia is viewable through the second aperture.

10. The assembly of claim 7, wherein the label includes a third portion of the activation indicia spaced apart from the first portion,
wherein the third panel includes structure defining a second aperture spaced apart from the first aperture via a portion of the third panel extending therebetween, the second portion of the activation indicia being printed on the portion of the third panel, and
wherein the third portion of the activation indicia is viewable through the second aperture, and is aligned with the first and second portions such that the activation indicia is readable to activate the card.

11. The assembly of claim 7, wherein the second panel includes structure defining a pull tab such that, when assembled, the pull tab obscures the at least one of the first and second portions of the activation indicia, and is configured to be pulled back to reveal the activation indicia in its entirety.

12. The assembly of claim 7, wherein the first, second and third panels each include structure defining a tamper evident tear strip portion, such that, when assembled, the carrier includes a tamper evident tear strip along a single edge of the carrier, the tear strip being configured to be destructively removed to allow access to the card within the carrier.

13. The assembly of claim 7, wherein the assembly does not include any complete alphanumeric human readable indicia related to the activation indicia.

14. A stored value card and carrier assembly, the assembly comprising:
a multi-panel carrier including a first panel, a second panel, and a third panel extending from an edge of the first panel;
a stored value card positioned on the first panel;
a label, wherein a first portion of the label is coupled to the third panel via an adhesive, and wherein the third panel is foldable onto the first panel and a second portion of the label is coupled the card positioned on the first panel, and wherein, when assembled, the first and second panels sandwich the third panel and card therebetween; and
activation indicia, wherein the label includes a first portion of the activation indicia deposited thereon, and the card includes a second portion of the activation indicia deposited thereon, wherein, when the assembly is assembled, the first and second portions are aligned and the activation indicia is readable to activate the stored value card, and
wherein removal of the stored value card from the carrier causes the label having the first portion thereon to remain coupled to the third panel, rendering the second portion of the activation indicia on the card unreadable.

15. The assembly of claim 14, wherein the label comprises a polymeric label, wherein the first portion of the label is adhered via a permanent adhesive to a free end of the third panel, and wherein the second portion of the label is coupled via a removable adhesive to the card.

16. The assembly of claim 14, wherein the label and the third panel comprises a non-rewettable polymeric material, and wherein the first portion of the label is heat sealed to a free end of the third panel, and wherein the second portion of the label is coupled via a removable adhesive to the card.

17. The assembly of claim 14, wherein the first panel and second panel are foldable relative to each other to form front and back panels of the assembly.

18. The assembly of claim 14, wherein the first panel and second panel are discrete panels that when assembly, are adhered to each other to form front and back panels of the assembly.

19. The assembly of claim 14, wherein the second panel includes structure defining a pull tab, such that, when assembled, the pull tab is configured to obscure at least one of the first and second portions of the activation indicia, and the pull tab is configured to be pulled back to reveal the first and second portions of the activation indicia.

20. The assembly of claim 14, wherein a third portion of the activation indicia is deposited on the third panel, the third portion being aligned with the first and second portions when the assembly is assembled such that the activation indicia is readable to activate the card.

* * * * *

UNITED STATES PATENT AND TRADEMARK OFFICE
CERTIFICATE OF CORRECTION

PATENT NO. : 10,275,698 B2
APPLICATION NO. : 15/585953
DATED : April 30, 2019
INVENTOR(S) : Pascua et al.

Page 1 of 1

It is certified that error appears in the above-identified patent and that said Letters Patent is hereby corrected as shown below:

In the Claims

Column 16, Line 50:
After "coupled" insert --to--.

Column 17, Line 12:
Delete "assembly" and insert --assembled--.

Signed and Sealed this
Thirtieth Day of July, 2019

Andrei Iancu
*Director of the United States Patent and Trademark Office*